US011959656B2

United States Patent
Nakahara (10) Patent No.: US 11,959,656 B2
(45) Date of Patent: Apr. 16, 2024

(54) CONTROL APPARATUS AND CONTROL SYSTEM

(71) Applicant: DAIKIN INDUSTRIES, LTD., Osaka (JP)

(72) Inventor: Takayuki Nakahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/125,598

(22) Filed: Mar. 23, 2023

(65) Prior Publication Data

US 2023/0228442 A1    Jul. 20, 2023

Related U.S. Application Data

(63) Continuation of application No. PCT/JP2021/037167, filed on Oct. 7, 2021.

(30) Foreign Application Priority Data

Oct. 8, 2020    (JP) ................................ 2020-170499

(51) Int. Cl.
*F24F 11/63*    (2018.01)
*G05B 15/02*    (2006.01)
*H04Q 9/00*    (2006.01)

(52) U.S. Cl.
CPC ............. *F24F 11/63* (2018.01); *G05B 15/02* (2013.01); *H04Q 9/00* (2013.01); *H04Q 2209/75* (2013.01)

(58) Field of Classification Search
CPC .......... F24F 11/63; G05B 15/02; H04Q 9/00; H04Q 2209/75
See application file for complete search history.

(56) References Cited

U.S. PATENT DOCUMENTS

2011/0137971 A1* 6/2011 Horii ..................... H04L 1/1887
 709/201
2012/0065748 A1* 3/2012 Nixon .................... G05B 21/02
 700/73

(Continued)

FOREIGN PATENT DOCUMENTS

EP    2 725 436 A1    4/2014
JP    6-129756 A    5/1994

(Continued)

OTHER PUBLICATIONS

International Preliminary Report of corresponding PCT Application No. PCT/JP2021/037167 dated Apr. 20, 2023.

(Continued)

*Primary Examiner* — Kidest Bahta
(74) *Attorney, Agent, or Firm* — Global IP Counselors, LLP (57) ABSTRACT

A control apparatus is communicably connected to a first apparatus to perform a control on the first apparatus. The control apparatus includes a data collecting unit, a collection interval determining unit, and a storing unit. The data collecting unit collects, by polling and from the first apparatus, data in order to perform the control. The collection interval determining unit determines, based on a setting content of the control, a collection interval of the data collected by the data collecting unit. The control apparatus performs a plurality of the controls on one first apparatus. The storing unit stores, for each of the controls, one data item or a plurality of data items constituting the data. The storing unit further stores, for each of the data items, the collection interval.

19 Claims, 4 Drawing Sheets

(56) References Cited

U.S. PATENT DOCUMENTS

| | | | | |
|---|---|---|---|---|
| 2013/0102301 A1* | 4/2013 | Shinada | ............... | H04W 28/12 |
| | | | | 455/418 |
| 2015/0280934 A1 | 10/2015 | Fujiwara et al. | | |
| 2016/0321403 A1* | 11/2016 | Wang | .................... | G16H 50/20 |
| 2018/0080890 A1* | 3/2018 | Potyrailo | ................ | H04Q 9/00 |

FOREIGN PATENT DOCUMENTS

| | | | |
|---|---|---|---|
| JP | 11-94334 | A | 4/1999 |
| JP | 2004-348319 | A | 12/2004 |
| JP | 2009-180414 | A | 8/2009 |
| JP | 2014-85803 | A | 5/2014 |
| JP | 2015-186096 | A | 10/2015 |
| JP | WO2018/179366 | A1 | 10/2018 |
| WO | 2013/172061 | A1 | 11/2013 |

OTHER PUBLICATIONS

International Search Report of corresponding PCT Application No. PCT/JP2021/037167 dated Nov. 9, 2021.
European Search Report of corresponding EP Application No. 21 877 711.8 dated Feb. 26, 2024.

* cited by examiner

CONTROL APPARATUS AND CONTROL SYSTEM

CROSS-REFERENCE TO RELATED APPLICATIONS

This is a continuation of International Application No. PCT/JP2021/037167 filed on Oct. 7, 2021, which claims priority to Japanese Patent Application No. 2020-170499, filed on Oct. 8, 2020. The entire disclosures of these applications are incorporated by reference herein.

BACKGROUND

Technical Field

The present disclosure relates to a control apparatus and a control system.

Background Art

As disclosed in International Publication No. WO 2018/179366, there is a technique for, in a case where operation data of a plurality of refrigeration cycle apparatuses is collected, determining a priority of each refrigeration cycle apparatus, and setting the data collection intervals according to the priorities.

SUMMARY

A control apparatus of a first aspect is communicably connected to a first apparatus to perform a control on the first apparatus. The control apparatus includes a data-collecting unit and a collection-interval-determining unit. The data-collecting unit collects, by polling and from the first apparatus, data for performing the control. On the basis of a setting content of the control, the collection-interval-determining unit determines a collection interval of the data collected by the data-collecting unit.

DETAILED DESCRIPTION OF EMBODIMENT(S)

(1) Overall Configuration of Air-Conditioning System

Figure 1:
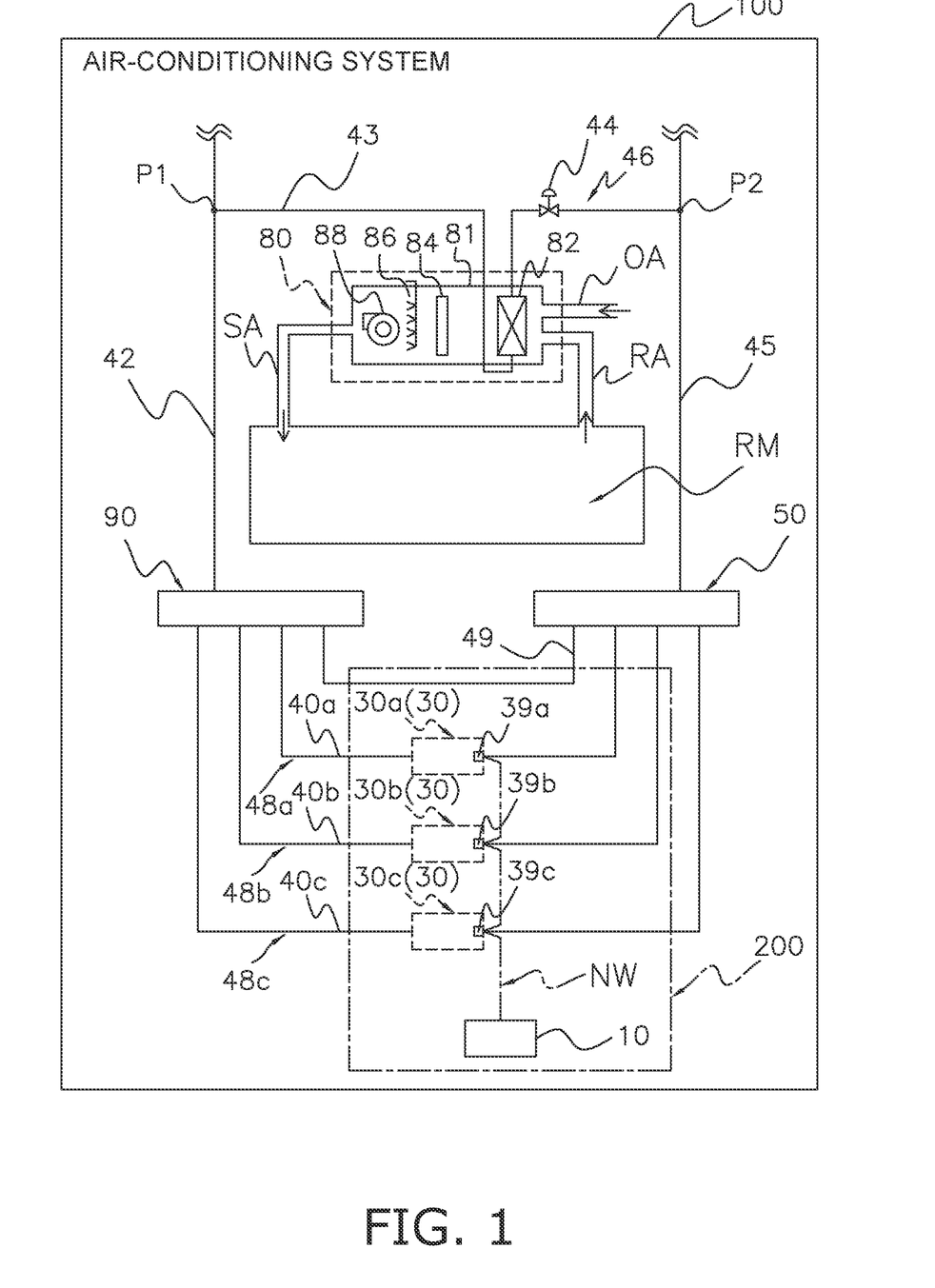
FIG. 1 is an overall configuration diagram of an air-conditioning system.

An air-conditioning system 100 conditions air of a target space RM in a building. FIG. 1 is an overall configuration diagram of the air-conditioning system 100. As shown in FIG. 1, the air-conditioning system 100 includes a control system 200. The control system 200 includes a control apparatus 10, and one first apparatus 30 or a plurality of first apparatuses 30.

The first apparatus 30 is an air conditioner, such as an air conditioner or heat source equipment. The air-conditioning system 100 includes the one first apparatus 30 or the plurality of first apparatuses 30 of a plurality of types. In the present embodiment, the first apparatuses 30 are three chiller units 30a to 30c. Therefore, in FIG. 1, the chiller units 30a to 30c are shown as the first apparatuses 30.

The control apparatus 10 is an apparatus that controls the first apparatus 30. The air-conditioning system 100 includes one control apparatus 10 or a plurality of control apparatuses 10 of a plurality of types. For example, the control apparatus 10 may perform a plurality of controls on one first apparatus 30, or may perform a plurality of controls on each of a plurality of first apparatuses 30. In the present embodiment, the control apparatus 10 performs a plurality of controls on each of the three chiller units 30a to 30c.

As shown in FIG. 1, the control apparatus 10 is communicably connected to the chiller units 30a to 30c through a network NW. The network NW is, for example, Modbus, BACnet, Ethernet, and the like.

As shown in FIG. 1, the air-conditioning system 100 also includes air-conditioning units 80. FIG. 1 shows one of the plurality of air-conditioning units 80 as a representative. In the present embodiment, the air-conditioning unit 80 is assumed to be an air-handling unit. However, the air-conditioning unit 80 is not limited to an air-handling unit, and may be another air conditioner, such as a fan coil unit.

(2) Detailed Configuration of Air-Conditioning System
(2-1) Chiller Unit

Figure 2:
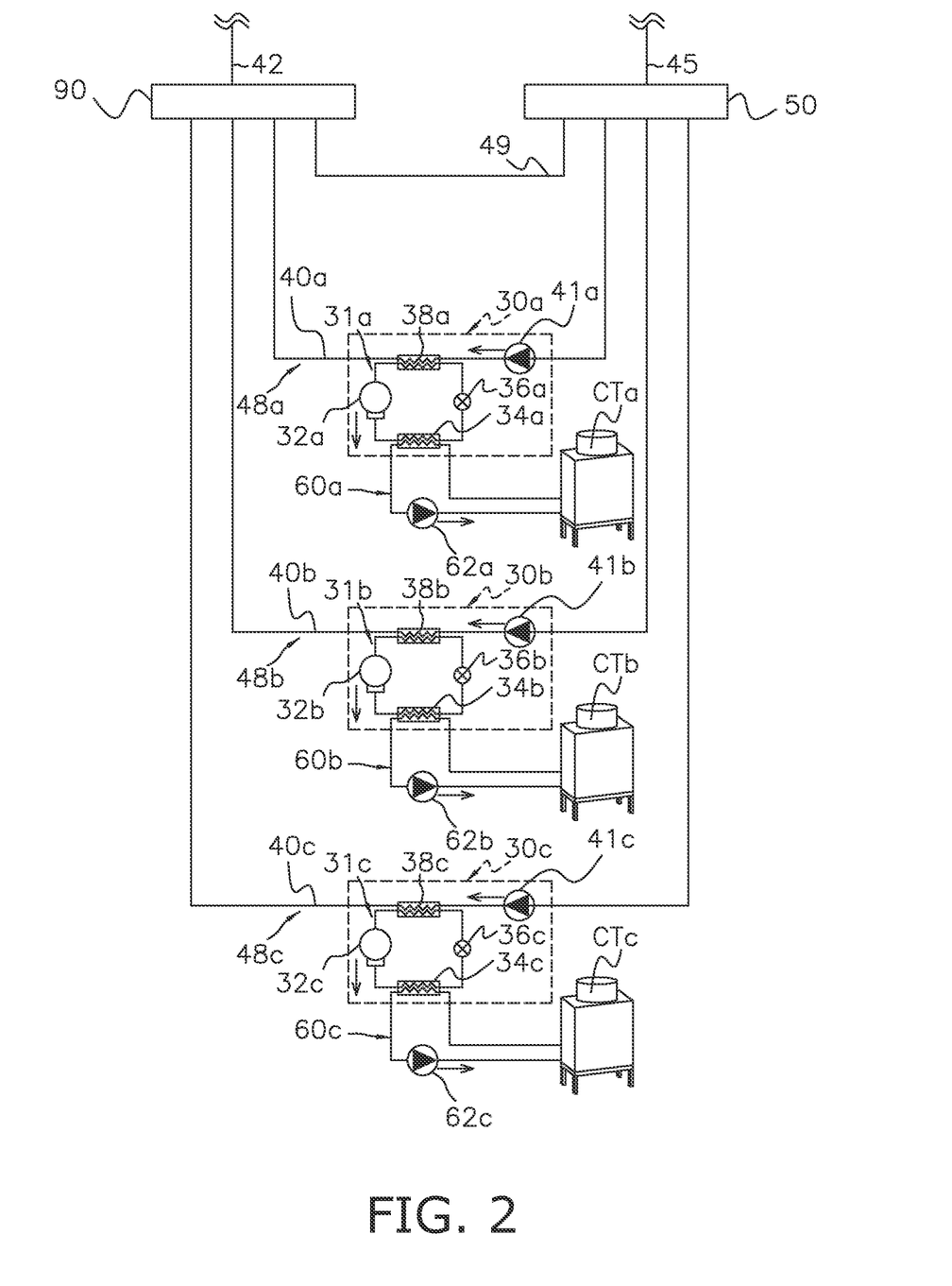
FIG. 2 is a diagram showing refrigerant circuits of chiller units.

FIG. 2 is a diagram showing refrigerant circuits of the chiller units 30a to 30c. As shown in FIGS. 1 and 2, the chiller units 30a to 30c mainly include compressors 32a to 32c, radiators 34a to 34c, expansion valves 36a to 36c, evaporators 38a to 38c, primary pumps 41a to 41c, various sensors (not shown), and control units 39a to 39c. The compressors 32a to 32c, the radiators 34a to 34c, the expansion valves 36a to 36c, and the evaporators 38a to 38c are connected to each other by first refrigerant circuits 31a to 31c. The first refrigerant circuits 31a to 31c are filled with a refrigerant, such as R32. The primary pumps 41a to 41c are installed in heat-source-side flow channels 40a to 40c. Water as a heat carrier flows through heat-source-side circuits 48a to 48c.

The compressors 32a to 32c suck in low-pressure refrigerant, compress the refrigerant with a compression mechanism (not shown), and discharge the compressed refrigerant. The compressors 32a to 32c are, for example, rotary-type or scroll-type positive displacement compressors. The compression mechanisms of the compressors 32a to 32c are driven by compressor motors (not shown). The compressor motor is a motor whose number of revolutions can be controlled by an inverter. The number of revolutions of the compressor motors are controlled to control the capacities of the compressors 32a to 32c.

The radiators 34a to 34c include first heat transfer tubes connected to the first refrigerant circuits 31a to 31c, and second heat transfer tubes connected to second refrigerant circuits 60a to 60c. The radiators 34a to 34c perform heat exchange between the refrigerant flowing through the first heat transfer tubes on the first-refrigerant-circuits-31a-to-31c side, and the heat carrier flowing through the second heat transfer tubes on the second-refrigerant-circuits-60a-to-60c side. The radiators 34a to 34c are, for example, a fin-and-tube-type heat exchanger including the plurality of heat transfer tubes and fins.

The expansion valves 36a to 36c are mechanisms for adjusting pressures and flow rates of the refrigerant flowing through the first refrigerant circuits 31a to 31c. In the present embodiment, the expansion valves 36a to 36c are electronic expansion valves.

The evaporators 38a to 38c include first heat transfer tubes connected to the first refrigerant circuits 31a to 31c, and second heat transfer tubes connected to the heat-source-side flow channels 40a to 40c. The evaporators 38a to 38c perform heat exchange between the refrigerant flowing through the first heat transfer tubes on the first-refrigerant-circuits-31a-to-31c side, and the heat carrier flowing through the second heat transfer tubes on the heat-source-side-flow-channels-40a-to-40c side, respectively. The evaporators 38a to 38c are, for example, a fin-and-tube-type heat exchanger including the plurality of heat transfer tubes and fins.

The primary pumps 41a to 41c feed out the water of the heat-source-side flow channels 40a to 40c from the upstream side to the downstream side. Since the primary pumps 41a to 41c are inverter-driven pumps, the capacities can be regulated, and the leaving-water pressures (or discharge flow rates) can be adjusted.

In the present embodiment, the various sensors included in the chiller units 30a to 30c include cold-water temperature sensors, outdoor-air temperature sensors, and outdoor-air humidity sensors. The cold-water temperature sensors measure the temperatures of the water that has passed through the evaporators 38a to 38c and flows through the heat-source-side flow channels 40a to 40c. The outdoor-air temperature sensors measure the temperatures of outdoor air in which the chiller units 30a to 30c are installed. The outdoor-air humidity sensors measure the humidity of the outdoor air in which the chiller units 30a to 30c are installed.

The control units 39a to 39c receive control signals from the control apparatus 10, and control the operations of the chiller units 30a to 30c. The control units 39a to 39c include a control arithmetic device and a storage device. As the control arithmetic device, a processor, such as a central processing unit (CPU) or a graphics processing unit (GPU), can be used. The control arithmetic device reads programs stored in the storage device, and performs predetermined arithmetic processing in accordance with the programs. In addition, according to the programs, the control arithmetic device can write an arithmetic result into the storage device, and can read information stored in the storage device. The control units 39a to 39c also include timers.

The control units 39a to 39c are electrically connected to each equipment in the chiller units 30a to 30c, such as the compressors 32a to 32c and the primary pumps 41a to 41c, and are electrically connected to various sensors, such as the outdoor-air temperature sensors, the outdoor-air humidity sensors, and the leaving-water temperature sensors, to exchange control signals and information.

As shown in FIG. 1, the control units 39a to 39c are communicably connected to the control apparatus 10 through the network NW. The control units 39a to 39c receive control signals from the control apparatus 10 through the network NW. The control units 39a to 39c also periodically transmit, to the control apparatus 10, data necessary for the control of the chiller units 30a to 30c by the control apparatus 10. In the present embodiment, the data transmitted from the control units 39a to 39c to the control apparatus 10 includes an operation capacity DI1, a leaving-water temperature DI2, outdoor-air humidity DI3, and an outdoor-air temperature DI4. Hereinafter, the operation capacity DI1, the leaving-water temperature DI2, the outdoor-air humidity DI3, and the outdoor-air temperature DI4 will be referred to as data items DI. The operation capacities DI1 are indicators indicating the operating amounts of the chiller units 30a to 30c, and are calculated from, for example, the number of revolutions of the compressor motors of the compressors 32a to 32c. The leaving-water temperature DI2 is a value measured by the leaving-water temperature sensor. The outdoor-air humidity DI3 is a value measured by the outdoor-air humidity sensor. The outdoor-air temperature DI4 is a value measured by the outdoor-air temperature sensor. The data items DI that the control units 39a to 39c transmit to the control apparatus 10 depend on the type of control performed by the control apparatus 10 on the chiller units 30a to 30c.

(2-2) Second Refrigerant Circuit

The second refrigerant circuits 60a to 60c are filled with water as a heat carrier. As shown in FIG. 2, the second refrigerant circuits 60a to 60c are connected to the radiators 34a to 34c, water pumps 62a to 62c, and cooling towers CTa to CTc. The water pumps 62a to 62c can adjust discharge flow rates, and circulate the water of the second refrigerant circuits 60a to 60c. The cooling towers CTa to CTc cool the water circulating through the second refrigerant circuits 60a to 60c. In FIG. 2, the arrows attached to the water pumps 62a to 62c indicate the direction in which the water flows.

(2-3) Heat-Source-Side Circuit

Water as a heat carrier flows through the heat-source-side circuits 48a to 48c. As shown in FIG. 2, the heat-source-side circuits 48a to 48c include the heat-source-side flow channels 40a to 40c, the primary pumps 41a to 41c provided in the middle of the heat-source-side flow channels 40a to 40c, and heat-transfer-tube portions of the evaporators 38a to 38c connected to the heat-source-side flow channels 40a to 40c. The water as a heat carrier circulating through the heat-source-side flow channels 40a to 40c is cooled in the evaporators 38a to 38c. In FIG. 2, the arrows attached to the primary pumps 41a to 41c indicate the direction in which the water flows.

(2-4) Return Header Portion

As shown in FIG. 1, water that has passed through a usage-side circuit 46 is fed to the heat-source-side circuits 48a to 48c via a return header portion 50. The upstream sides of the heat-source-side circuits 48a to 48c are connected to the downstream side of the return header portion 50. The downstream side of a usage-downstream-side merging-tube 45, which will be described later, is connected to the upstream side of the return header portion 50.

The return header portion 50 is provided with a flow rate sensor (not shown) for measuring the flow rate of water passing therethrough.

(2-5) Leaving-Header Portion

As shown in FIG. 1, the water that has passed through the heat-source-side circuits 48a to 48c is fed to the usage-side circuit 46 via a leaving-header portion 90. The downstream sides of the heat-source-side circuits 48a to 48c are connected to the upstream side of the leaving-header portion 90. The upstream side of a usage-upstream-side merging-tube 42, which will be described later, is connected to the downstream side of the leaving-header portion 90.

The leaving-header portion 90 is provided with a secondary pump (not shown), and can feed water from the heat-source-side circuits 48a to 48c toward the usage-side circuit 46. The secondary pump is an inverter-driven pump, and the capacity can be regulated to adjust the discharge flow rate.

(2-6) Bypass Circuit

As shown in FIG. 1, a bypass circuit 49 extends from the leaving-header portion 90 to the return header portion 50, and does not merge with the heat-source-side circuits 48a to 48c and the usage-side circuit 46.

The bypass circuit 49 is provided to return water excessively fed to the leaving-header portion 90, to the return header portion 50.

(2-7) Usage-Side Circuit

As shown in FIG. 1, the usage-upstream-side merging-tube 42 extending from the leaving-header portion 90 toward the downstream side branches, at a branching point P1, into the usage-side circuit 46 and a tube connected to another usage-side circuit (not shown). Further, the usage-side circuit 46 and the tube connected to another usage-side circuit (not shown) merge at a merging point P2. A usage-downstream-side merging-tube 45 extends from the merging point P2, and a downstream-side end portion of the usage-downstream-side merging-tube 45 is connected to the return header portion 50.

Water as a heat carrier flows through the usage-side circuit 46. The usage-side circuit 46 includes a usage-side flow channel 43, a flow-rate-adjusting valve 44 provided in the middle of the usage-side flow channel 43, and an air-cooling heat exchanger 82 connected to the usage-side flow channel 43. The flow-rate-adjusting valve 44 controls the valve opening degree to adjust the flow rate of the water flowing through the usage-side flow channel 43.

(2-8) Air-Conditioning Unit

As shown in FIG. 1, the air-conditioning unit 80 includes a casing 81 having a substantially rectangular-parallelepiped shape. An air passage through which air circulates is formed inside the casing 81. One end of a ventilation duct RA is connected to an inflow end of the air passage of the casing 81. The other end of the ventilation duct RA is connected to the target space RM. One end of an outdoor-air duct OA is also connected to the inflow end of the air passage. The other end of the outdoor-air duct OA is connected to the outdoor. One end of an air supply duct SA is connected to an outflow end of the air passage. The other end of the air supply duct SA is connected to the target space RM. Air in the target space RM and outdoor air are taken into the casing 81 through the ventilation duct RA and the outdoor-air duct OA, respectively. The temperature and humidity of the taken-into air are regulated in the casing 81. The air whose temperature and humidity have been regulated is fed to the target space RM through the air supply duct SA. In this way, the air in the target space RM is conditioned.

In the air passage in the casing 81, the air-cooling heat exchanger 82, an electric heater 84, a water spray humidifier 86, and a fan 88 are installed in this order from the upstream side to the downstream side. The air-cooling heat exchanger 82 is equipment that cools air to lower the temperature of the air, or dehumidifies air to lower the humidity. The air-cooling heat exchanger 82 is a fin-and-tube-type heat exchanger including a plurality of heat transfer fins, and a heat transfer tube penetrating the heat transfer fins. The electric heater 84 heats the air that has passed through the air-cooling heat exchanger 82. The electric heater 84 can adjust the heating amount of the air. The water spray humidifier 86 humidifies air flowing in the casing 81 by spraying, into the air from a nozzle, water in a tank (not shown) installed outside the casing 81. The water spray humidifier 86 can adjust the humidification amount of the air. The fan 88 generates a flow of the air to be blown into the target space RM through the air-cooling heat exchanger 82, the electric heater 84, and the water spray humidifier 86. The fan 88 can change the number of revolutions in a stepwise manner by inverter control to adjust the blowing amount.

(2-9) Control Apparatus

Figure 3:
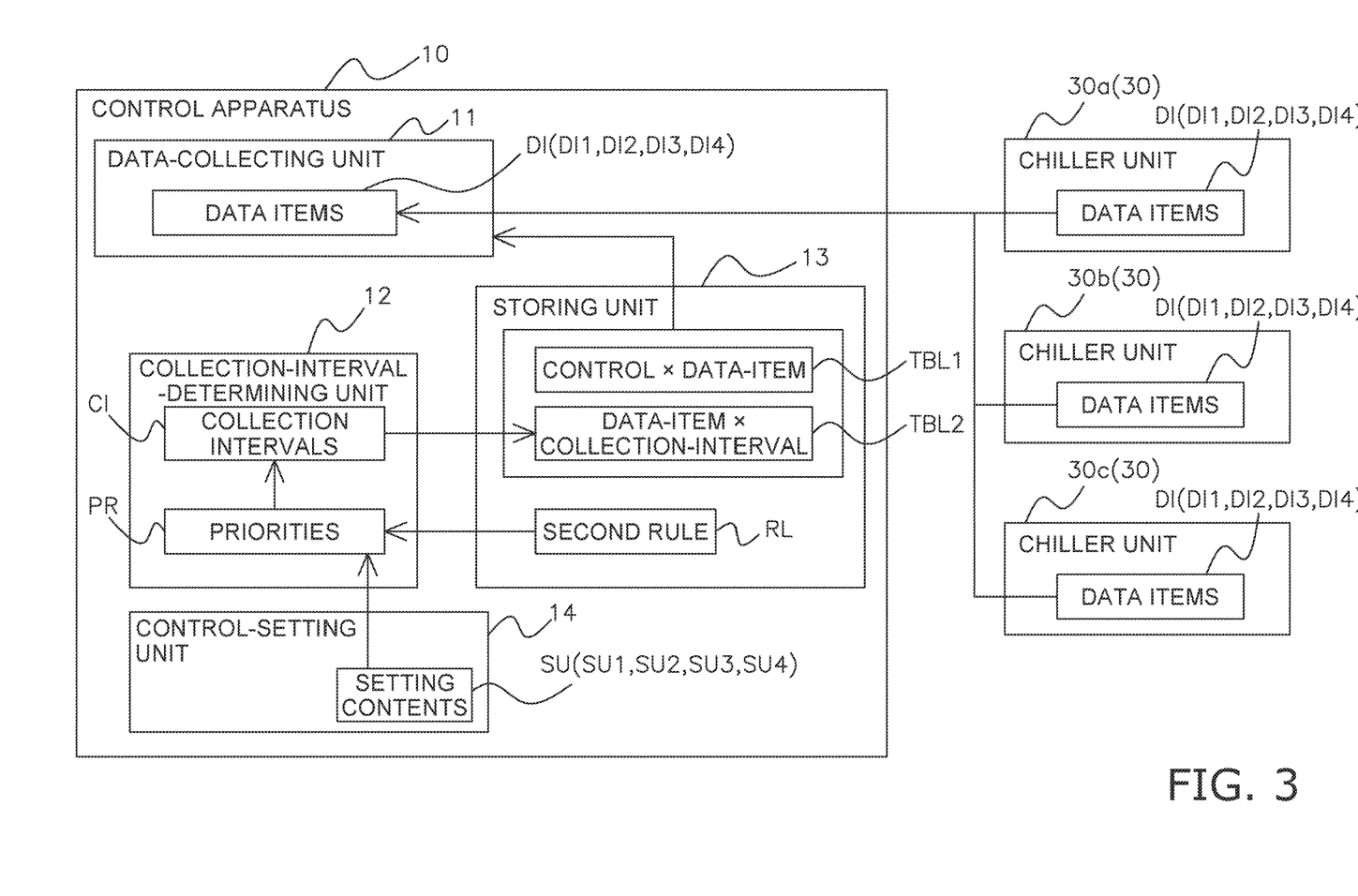
FIG. 3 is a functional block diagram of a control apparatus.

The control apparatus 10 controls the chiller units 30a to 30c (first apparatuses 30). FIG. 3 is a functional block diagram of the control apparatus 10. As shown in FIG. 3, the control apparatus 10 mainly includes a data-collecting unit 11 and a collection-interval-determining unit 12.

The control apparatus 10 includes a control arithmetic device and a storage device. As the control arithmetic device, a processor, such as a CPU or a GPU, can be used. The control arithmetic device reads programs stored in the storage device, and performs predetermined arithmetic processing in accordance with the programs. In addition, according to the programs, the control arithmetic device can write an arithmetic result into the storage device, and can read information stored in the storage device. The control apparatus 10 also includes a timer. The data-collecting unit 11, the collection-interval-determining unit 12, a storing unit 13 to be described later, and a control-setting unit 14 to be described later are various functional blocks implemented by the control arithmetic device and the storage device.

The control apparatus 10 is configured to receive various signals transmitted from a remote controller (not shown) operated by the user. The various signals transmitted from the remote controller include signals instructing operation or stop of the chiller units 30a to 30c, and signals related to various settings. The signals related to various settings include, for example, a change signal of a setting content SU of each control on the chiller units 30a to 30c, a switching signal of the operation mode, a signal related to a set temperature and a set humidity, and the like.

As shown in FIG. 1, the control apparatus 10 is communicably connected to the chiller units 30a to 30c (first apparatuses 30) through the network NW. On the basis of, for example, various signals transmitted from the remote controller, the control apparatus 10 transmits control signals to the chiller units 30a to 30c through the network NW.

In the present embodiment, controls performed by the control apparatus 10 on the chiller units 30a to 30c include a light-load operation control, a cold-water-freezing prevention control, a double-set-point control, and a free-cooling control. These controls are an example of controls performed by the control apparatus 10 on the chiller units 30a to 30c. Therefore, controls performed by the control apparatus 10 on the chiller units 30a to 30c are not limited to these controls.

The light-load operation control is a control for making the chiller units 30a to 30c perform a light-load operation on the basis of the operation capacities DI1 and the leaving-water temperatures DI2 of the chiller units 30a to 30c. Specifically, the light-load operation control is a control for notifying the user and making the chiller units 30a to 30c perform a light-load operation in a case where, for example, a state where the operation capacities DI1 of the chiller units 30a to 30c are 25% or less and the leaving-water temperatures DI2 of the chiller units 30a to 30c are 7.5° C. or lower continues for a predetermined time SU1. In other words, the control apparatus 10 makes the chiller units 30a to 30c perform a light-load operation in a case where a state where the chiller units 30a to 30c do not operate so much and the leaving-water temperatures DI2 are low to some extent continues for the predetermined time SU1. The predetermined time SU1 is a setting content SU of the light-load operation control.

The cold-water-freezing prevention control is a control for forcibly operating the primary pumps 41a to 41c on the basis of the leaving-water temperatures DI2 and the outdoor-air temperatures DI4 of the chiller units 30a to 30c. Specifically, the cold-water-freezing prevention control is, for example, a control for forcibly operating the primary pumps 41a to 41c in a case where a state where the leaving-water temperatures DI2 of the chiller units 30a to 30c are 3.0° C.

or lower and the outdoor-air temperatures DI4 of the chiller units 30a to 30c are 0° C. or lower continues for a predetermined time SU2. In other words, in a case where a state where the leaving-water temperatures DI2 and the outdoor-air temperatures DI4 are low to some extent continues for the predetermined time SU2, the control apparatus 10 forcibly operates the primary pumps 41a to 41c so that the water does not freeze. The predetermined time SU2 is a setting content SU of the cold-water-freezing prevention control.

The double-set-point control is a control for changing set temperatures on the basis of the outdoor-air temperatures DI4 of the chiller units 30a to 30c. Specifically, the double-set-point control is, for example, a control for changing the set temperatures of the chiller units 30a to 30c in a case where a state where the outdoor-air temperatures DI4 of the chiller units 30a to 30c are 20° C. or lower continues for a predetermined time SU3. In other words, in a case where a state where the outdoor-air temperatures DI4 are low to some extent continues for the predetermined time SU3, the control apparatus 10 raises the set temperatures of the chiller units 30a to 30c to save energy. The predetermined time SU3 is a setting content SU of the double-set-point control.

The free-cooling control is a control for stopping the operation of the chiller units 30a to 30c on the basis of the outdoor-air humidity DI3 and outdoor-air temperatures DI4 of the chiller units 30a to 30c. Specifically, the free-cooling control is, for example, a control for stopping the operation of the chiller units 30a to 30c in a case where a state where the wet-bulb temperatures of the chiller units 30a to 30c (calculated from the outdoor-air humidity DI3 and the outdoor-air temperatures DI4) are 13° C. or lower and the outdoor-air temperatures DI4 of the chiller units 30a to 30c are 18° C. or lower continues for a predetermined time SU4. In other words, in a case where a state where the wet-bulb temperatures and the outdoor-air temperatures DI4 are low to some extent continues for the predetermined time SU4, the control apparatus 10 stops the operation of the chiller units 30a to 30c because cooling with the outdoor air is possible. The predetermined time SU4 is a setting content SU of the free-cooling control.

(2-9-1) Data-Collecting Unit

The data-collecting unit 11 collects, by polling and from the chiller units 30a to 30c (first apparatuses 30), data for performing the light-load operation control, the cold-water-freezing prevention control, the double-set-point control, and the free-cooling control. Here, the term "polling" is used to mean periodically collecting data. Further, the data includes the data items DI. As described above, in the present embodiment, the data items DI include the operation capacity DI1, the leaving-water temperature DI2, the outdoor-air humidity DI3, and the outdoor-air temperature DI4.

As shown in FIG. 3, the data-collecting unit 11 refers to two tables stored in the storing unit 13 to collect the data items DI from the chiller units 30a to 30c. The first table is a table that sets the correspondences between the types of the controls and the data items DI to be collected to perform the controls (hereafter referred to as a control×data-item table TBL1). The second table is a table that sets a collection interval CI of each of the data items DI (hereafter referred to as a data-item×collection-interval table TBL2). In the present embodiment, the collection interval CI is expressed by the number of times of the collections per unit time.

(2-9-2) Storing Unit

The storing unit 13 stores various types of data in the storage device.

As shown in FIG. 3, the storing unit 13 stores, for each type of control, one data item DI or a plurality of data items DI that constitutes data collected from the chiller units 30a to 30c. This corresponds to the control×data-item table TBL1 described above. Table 1 below summarizes the contents of the control×data-item table TBL1.

TABLE 1

| Data item | Type of control | | | |
|---|---|---|---|---|
| | Light-load operation control | Cold-water-freezing prevention control | Double-set-point control | Free-cooling control |
| Operation capacity | o | | | |
| Leaving-water temperature | o | o | | |
| Outdoor-air humidity | | | | o |
| Outdoor-air temperature | | o | o | o |

In Table 1, circles are shown in corresponding portions. For example, in order to perform the light-load operation control, the operation capacity DI1 and the leaving-water temperature DI2 are necessary as the data items DI. The data-collecting unit 11 refers to the control×data-item table TBL1 to identify the data items DI to be collected for each type of control.

As shown in FIG. 3, the storing unit 13 also stores a collection interval CI for each data item DI. This corresponds to the data-item×collection-interval table TBL2 described above. The collection interval CI is determined by the collection-interval-determining unit 12. A specific example of the data-item×collection-interval table TBL2 is Table 4 or 6 described later. The data-collecting unit 11 refers to the data-item×collection-interval table TBL2 to identify the collection interval CI of each data item DI.

As shown in FIG. 3, the storing unit 13 further stores a second rule RL under which priorities PR for the collection of each data item DI are determined from the control setting content SU. The details of the second rule RL will be described later.

(2-9-3) Control-Setting Unit

As shown in FIG. 3, the control-setting unit 14 sets the setting content SU of each control. As described above, in the present embodiment, the setting contents SU are the predetermined times SU1 to SU4.

For example, in a case where the chiller units 30a to 30c are activated, the control-setting unit 14 sets the predetermined times SU1 to SU4 to initial values, respectively.

For example, in a case where the control setting contents SU are changed by the user, the control-setting unit 14 sets the predetermined times SU1 to SU4 to respective values after the change.

(2-9-4) Collection-Interval-Determining Unit

On the basis of the control setting content SU, the collection-interval-determining unit 12 determines collection intervals CI of data collected by the data-collecting unit 11. As shown in FIG. 3, the determined collection intervals CI are stored in the data-item×collection-interval table TBL2 by the storing unit 13.

First, as shown in FIG. 3, on the basis of the second rule RL, the collection-interval-determining unit 12 determines, from the control setting content SU, the priorities PR at a time of the collection of the data items DI. The second rule RL is stored in the storage device by the storing unit 13.

In the second rule RL of the present embodiment, as shown in Table 2 below, for each data item DI, a priority PR of each corresponding type of control (partial priority) is set. In Table 2, the partial priorities are shown at the positions of the circles in Table 1. In the second rule RL of the present embodiment, it is assumed that the priority PR of each data item DI is the maximum value of the corresponding partial priorities. In Table 2, the rightmost column shows the priority PR of each data item DI. In Table 2, the priority PR of each data item DI is the maximum value of the partial priorities in the row direction. For example, for the leaving-water temperature DI2, the partial priority of the light-load operation control is two, and the partial priority of the cold-water-freezing prevention control is two. Therefore, the priority PR of the leaving-water temperature DI2 is two, which is the maximum value of the partial priorities.

TABLE 2

| Data item | Priority of each type of control | | | | Priority |
| --- | --- | --- | --- | --- | --- |
| | Light-load operation control | Cold-water-freezing prevention control | Double-set-point control | Free-cooling control | |
| Operation capacity | 4 | | | | 4 |
| Leaving-water temperature | 2 | 2 | | | 2 |
| Outdoor-air humidity | | | | 1 | 1 |
| Outdoor-air temperature | | 1 | 1 | 1 | 1 |

In the second rule RL, partial priorities in a case where the setting content SU of each control is an initial value (initial partial priorities) have been set. The initial partial priorities are set on the basis of, for example, past data or the like.

Further, in the second rule RL of the present embodiment, partial priorities in a case where the setting content SU of each control is changed by the user are set.

The second rule RL for the light-load operation control is, for example, a rule under which "Every time the predetermined time SU1 becomes shorter by X minutes from the initial value, the partial priorities of the operation capacity DI1 and the leaving-water temperature DI2 for the light-load operation control are set to values obtained by increasing the respective initial partial priorities by one. Every time the predetermined time SU1 becomes longer by Y minutes from the initial value, the partial priorities of the operation capacity DI1 and the leaving-water temperature DI2 for the light-load operation control are set to values obtained by subtracting one from the respective initial partial priorities". This means that, for example, in a case where the user shortens the predetermined time SU1, it is necessary to determine whether or not to perform a light-load operation within the shorter time, and thus, the operation capacity DI1 and the leaving-water temperature DI2 are frequently collected. Here, the X minutes and the Y minutes are, for example, predetermined values, such as five minutes. X minutes and Y minutes in the following description are similar.

The second rule RL for the cold-water-freezing prevention control is, for example, a rule under which "Every time the predetermined time SU2 becomes shorter by X minutes from the initial value, the partial priorities of the leaving-water temperature DI2 and outdoor-air temperature DI4 for the cold-water-freezing prevention control are set to values obtained by increasing the respective initial partial priorities by one. Every time the predetermined time SU2 becomes longer by X minutes from the initial value, the partial priorities of the leaving-water temperature DI2 and the outdoor-air temperature DI4 for the cold-water-freezing prevention control are set to values obtained by subtracting one from the respective initial partial priorities".

The second rule RL for the double-set-point control is, for example, a rule under which "Every time the predetermined time SU3 becomes shorter by X minutes from the initial value, the partial priority of the outdoor-air temperature DI4 for the double-set-point control is set to a value obtained by increasing the initial partial priority of the outdoor-air temperature DI4 by one. Every time the predetermined time SU3 becomes longer by X minutes from the initial value, the partial priority of the outdoor-air temperature DI4 for the double-set-point control is set to a value obtained by subtracting one from the initial partial priority of the outdoor-air temperature DI4".

The second rule RL for the free-cooling control is, for example, a rule under which "Every time the predetermined time SU4 becomes shorter by X minutes from the initial value, the partial priorities of the outdoor-air humidity DI3 and the outdoor-air temperature DI4 for the free-cooling control are set to values obtained by increasing the respective initial partial priorities by one. Every time the predetermined time SU4 becomes longer by X minutes from the initial value, the partial priorities of the outdoor-air humidity DI3 and the outdoor-air temperature DI4 for the free-cooling control are set to values obtained by subtracting one from the respective initial partial priorities".

Next, as shown in FIG. 3, on the basis of the determined priorities PR, the collection-interval-determining unit 12 determines the collection intervals CI of the data items DI. The collection-interval-determining unit 12 determines the collection interval CI of each data item DI such that the number of times of total collections per unit time by the data-collecting unit 11 is equal to or smaller than the first predetermined number of times. The first predetermined number of times is set to, for example, the maximum number of times of collections that can be performed according to the specifications of the network NW, the specifications of the control apparatus 10 and the chiller units 30a to 30c, and the like.

The collection-interval-determining unit 12 proportionally distributes the first predetermined number of times per unit time according to the priority PR of each data item DI to determine the collection interval CI of each data item DI.

Note that the collection-interval-determining unit 12 determines the collection interval CI of each data item DI such that the number of times of collections of each data item DI per unit time by the data-collecting unit 11 is equal to or larger than the second predetermined number of times set for each data item DI. The second predetermined number of times is the minimum number of times of the collections. In a case where among the number of times of collections of each data item DI obtained by proportionally distributing the first predetermined number of times per unit time according to the priorities PR, one of the numbers of times of collections is smaller than the second predetermined number of times, the collection-interval-determining unit 12 changes the one of the numbers of times of collections, to the second predetermined number of times, for example. The increment is, for example, proportionally distributed to the other data items DI according to the priorities PR to reduce the numbers of times of collections of the other data items DI.

Hereinafter, the collection interval CI at a time of activation of the chiller units 30a to 30c, and the collection interval CI in a case where the control setting content SU is changed by the user after the activation will be described using specific examples.

(2-9-4-1) Collection Interval at Time of Activation

In this case, an initial value is set for the setting content SU of each control by the control-setting unit 14. Therefore, the partial priorities are set to the initial partial priorities.

Table 3 below is an example in which the priority PR is determined for each data item DI of the chiller units 30a to 30c.

TABLE 3

Priority of each type of control

| First apparatus | Data item | Light-load operation control | Cold-water-freezing prevention control | Double-set-point control | Free-cooling control | Priority |
|---|---|---|---|---|---|---|
| Chiller unit 30a | Operation capacity | 4 | | | | 4 |
| | Leaving-water temperature | 2 | 2 | | | 2 |
| | Outdoor-air humidity | | | | 1 | 1 |
| | Outdoor-air temperature | | 1 | 1 | 1 | 1 |
| Chiller unit 30b | Operation capacity | 4 | | | | 4 |
| | Leaving-water temperature | 2 | 2 | | | 2 |
| | Outdoor-air humidity | | | | 1 | 1 |
| | Outdoor-air temperature | | 1 | 1 | 1 | 1 |
| Chiller unit 30c | Operation capacity | 4 | | | | 4 |
| | Leaving-water temperature | 2 | 2 | | | 2 |
| | Outdoor-air humidity | | | | 1 | 1 |
| | Outdoor-air temperature | | 1 | 1 | 1 | 1 |

Table 4 below is Table 3 to which the column of the collection interval CI is added. The partial priority is omitted. In Table 4, the first predetermined number of times per unit time is proportionally distributed according to the priorities PR to determine the collection interval CI of each data item DI of the chiller units 30a to 30c. In Table 4, the first predetermined number of times is set to 300.

TABLE 4

| First apparatus | Data item | Priority | Collection interval (Number of times of collections per unit time) |
|---|---|---|---|
| Chiller unit 30a | Operation capacity | 4 | 50 |
| | Leaving-water temperature | 2 | 25 |
| | Outdoor-air humidity | 1 | 12 |
| | Outdoor-air temperature | 1 | 12 |
| Chiller unit 30b | Operation capacity | 4 | 50 |
| | Leaving-water temperature | 2 | 25 |
| | Outdoor-air humidity | 1 | 12 |
| | Outdoor-air temperature | 1 | 12 |
| Chiller unit 30c | Operation capacity | 4 | 50 |
| | Leaving-water temperature | 2 | 25 |

TABLE 4-continued

| First apparatus | Data item | Priority | Collection interval (Number of times of collections per unit time) |
|---|---|---|---|
| | Outdoor-air humidity | 1 | 12 |
| | Outdoor-air temperature | 1 | 12 |

As shown in Table 4, for example, the operation capacity DI1 of the chiller unit 30a is determined such that the operation capacity DI1 is collected 50 times per unit time. Here, in a case where the calculated number of times of collections per unit time is not an integer, for example, the fractional part of the calculated result is discarded. In Table 4, the outdoor-air humidity DI3 of the chiller unit 30a and the like are rounded down after the decimal point.

(2-9-4-2) Collection Interval in a case where Control Setting Content is Changed by User Table 5 below shows a case where the predetermined time SU3 of the double-set-point control of the chiller unit 30a is changed from the state of Table 3 by the user, and the corresponding partial priority of the outdoor-air temperature DI4 is increased from one, which is the initial partial priority, to two. Accordingly, in Table 5, the priority PR of the outdoor-air temperature DI4 of the chiller unit 30a increases from one to two.

TABLE 5

Priority of each type of control

| First apparatus | Data item | Light-load operation control | Cold-water-freezing prevention control | Double-set-point control | Free-cooling control | Priority |
|---|---|---|---|---|---|---|
| Chiller unit 30a | Operation capacity | 4 | | | | 4 |
| | Leaving-water temperature | 2 | 2 | | | 2 |

TABLE 5-continued

| First apparatus | Data item | Priority of each type of control | | | | Priority |
| --- | --- | --- | --- | --- | --- | --- |
| | | Light-load operation control | Cold-water-freezing prevention control | Double-set-point control | Free-cooling control | |
| | Outdoor-air humidity | | | | 1 | 1 |
| | Outdoor-air temperature | | 1 | 2 | 1 | 2 |
| Chiller unit 30b | Operation capacity | 4 | | | | 4 |
| | Leaving-water temperature | 2 | 2 | | | 2 |
| | Outdoor-air humidity | | | | 1 | 1 |
| | Outdoor-air temperature | | 1 | 1 | 1 | 1 |
| Chiller unit 30c | Operation capacity | 4 | | | | 4 |
| | Leaving-water temperature | 2 | 2 | | | 2 |
| | Outdoor-air humidity | | | | 1 | 1 |
| | Outdoor-air temperature | | 1 | 1 | 1 | 1 |

Table 6 below is Table 5 to which the column of the collection interval CI is added. The partial priority is omitted. In Table 6, the first predetermined number of times per unit time is proportionally distributed according to the priorities PR to determine the collection interval CI of each data item DI of the chiller units 30a to 30c. In Table 6, the first predetermined number of times is set to 300, as in Table 4.

TABLE 6

| First apparatus | Data item | Priority | Collection interval (Number of times of collections per unit time) |
| --- | --- | --- | --- |
| Chiller unit 30a | Operation capacity | 4 | 48 |
| | Leaving-water temperature | 2 | 24 |
| | Outdoor-air humidity | 1 | 12 |
| | Outdoor-air temperature | 2 | 24 |
| Chiller unit 30b | Operation capacity | 4 | 48 |
| | Leaving-water temperature | 2 | 24 |
| | Outdoor-air humidity | 1 | 12 |
| | Outdoor-air temperature | 1 | 12 |
| Chiller unit 30c | Operation capacity | 4 | 48 |
| | Leaving-water temperature | 2 | 24 |
| | Outdoor-air humidity | 1 | 12 |
| | Outdoor-air temperature | 1 | 12 |

(3) Processing

Figure 4:
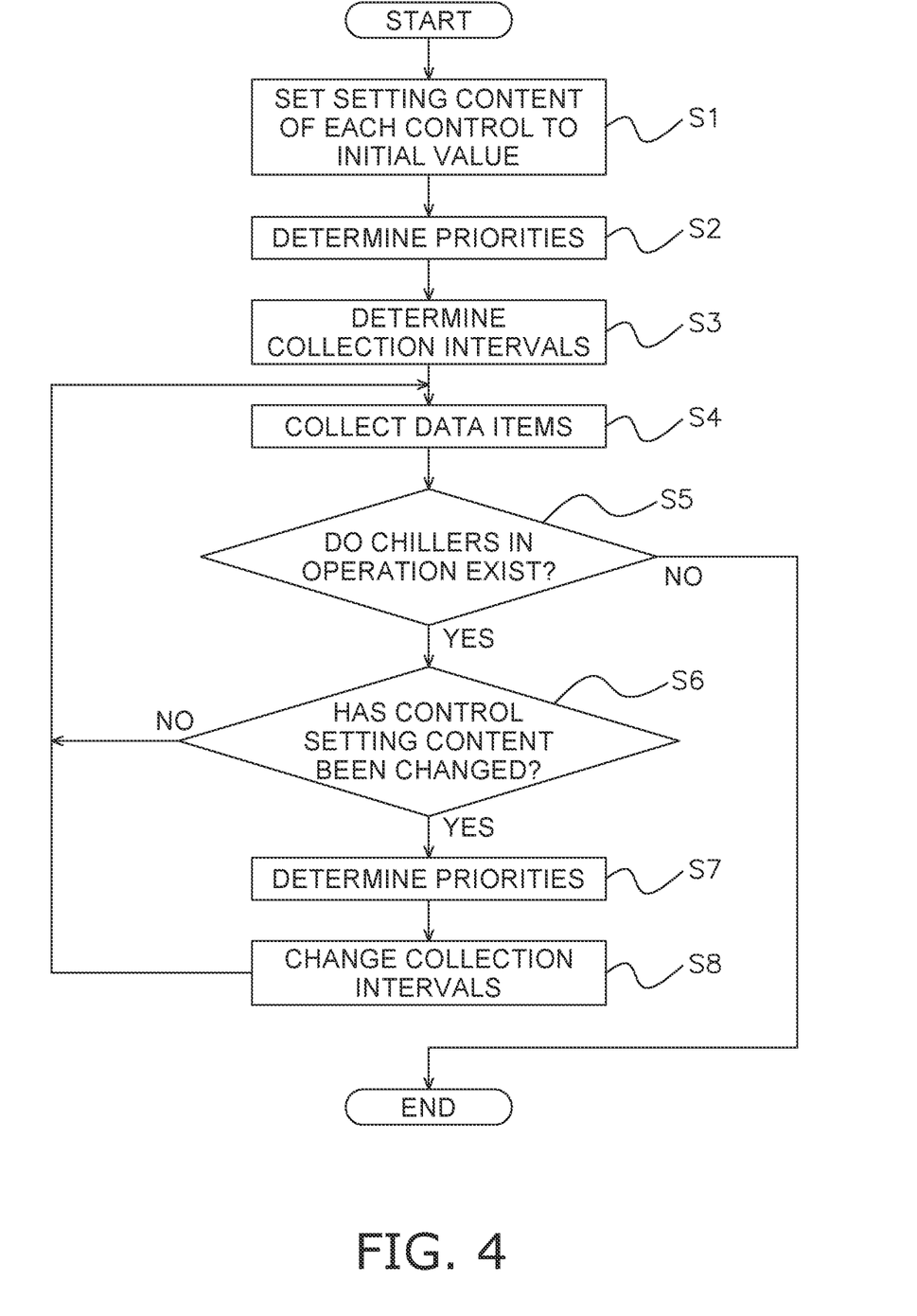
FIG. 4 is a flowchart of polling processing by the control apparatus.

Polling processing by the control apparatus 10 will be described with reference to the flowchart of FIG. 4.

As illustrated in step S1, when the chiller units 30a to 30c are activated, the control apparatus 10 sets the setting content SU of each control of the chiller units 30a to 30c, to the initial value.

When step S1 is ended, as shown in step S2, on the basis of the setting content SU (initial value) of each control, the control apparatus 10 determines the priority PR of each data item DI of the chiller units 30a to 30c.

When step S2 is ended, as shown in step S3, the control apparatus 10 proportionally distributes the first predetermined number of times according to the priorities PR determined in step S2 to determine the collection interval CI of each data item DI of the chiller units 30a to 30c.

When step S3 is ended, as shown in step S4, the control apparatus 10 collects each data item DI from the chiller units 30a to 30c on the basis of a control×data-item table TBL1 and a data-item×collection-interval table TBL2 reflecting the collection intervals CI determined in step S3.

When step S4 is ended, as shown in step S5, the control apparatus 10 determines whether or not the chiller units 30a to 30c in operation exist. In other words, the control apparatus 10 determines whether or not all the chiller units 30a to 30c have been stopped by the user. In a case where the operating chiller units 30a to 30c exist, the control apparatus 10 proceeds to step S6. In a case where the operating chiller units 30a to 30c do not exist, the control apparatus 10 ends the processing.

When the control apparatus 10 proceeds from step S5 to step S6, as shown in step S6, the control apparatus 10 determines whether or not the control setting content SU has been changed by the user. In a case where the control setting content SU has been changed by the user, the control apparatus 10 proceeds to step S7. In a case where the control setting content SU has not been changed by the user, the control apparatus 10 returns to step S4 and continues the data collection.

When the control apparatus 10 proceeds from step S6 to step S7, as shown in step S7, on the basis of the second rule RL and the setting content SU after the change, the control apparatus 10 determines the priority PR of one of the chiller units 30a to 30c whose control setting content SU has been changed.

When step S7 is ended, as shown in step S8, the control apparatus 10 proportionally distributes the first predetermined number of times according to the priority PR determined in step S7 to determine the collection interval CI of each data item DI of the chiller units 30a to 30c.

When step S8 is ended, the control apparatus 10 returns to step S4 and continues the data collection.

(4) Features (4-1)

There has been a technique for, in a case where operation data of a plurality of refrigeration cycle apparatuses is collected, determining a priority of each refrigeration cycle apparatus, and setting the data collection intervals according to the priorities.

However, since in the conventional technique, the data collection interval is set for each refrigeration cycle apparatus, the same data collection interval is set for all controls in the refrigeration cycle apparatuses. Therefore, there is a problem that appropriate data collection cannot be performed for each control.

The control apparatus 10 of the present embodiment is communicably connected to the first apparatuses 30 to perform the controls on the first apparatuses 30. The control apparatus 10 includes the data-collecting unit 11 and the collection-interval-determining unit 12. The data-collecting unit 11 collects, by polling and from the first apparatuses 30, data for performing the controls. The collection-interval-determining unit 12 determines, on the basis of the setting contents SU of the controls, the collection intervals CI of the data collected by the data-collecting unit 11.

In the control apparatus 10 of the present embodiment, on the basis of the setting contents SU of the controls on the first apparatuses 30 (refrigeration cycle apparatuses or the like), the collection-interval-determining unit 12 determines the collection intervals CI of the data collected by the data-collecting unit 11.

Therefore, the control apparatus 10 can set different data collection intervals CI for each control in the first apparatus 30. As a result, the control apparatus 10 can perform appropriate data collection for each control.

(4-2)

The control apparatus 10 of the present embodiment is communicably connected to the plurality of first apparatuses 30. The control apparatus 10 performs the plurality of controls on each of the plurality of first apparatuses 30.

As a result, the control apparatus 10 can determine the data collection interval CI of each of the plurality of controls performed on each of the plurality of first apparatuses 30.

(4-3)

The control apparatus 10 of the present embodiment further includes the storing unit 13. The storing unit 13 stores, for each type of control, one data item DI or a plurality of data items DI constituting the data.

As a result, the control apparatus 10 can identify, for each type of control, one data item DI or a plurality of data items DI to be collected.

(4-4)

In the control apparatus 10 of the present embodiment, the storing unit 13 further stores, for each data item DI, the collection interval CI.

As a result, the control apparatus 10 can identify, for each data item DI, the collection interval CI.

(4-5)

In the control apparatus 10 of the present embodiment, the collection-interval-determining unit 12 determines the collection interval CI of each data item DI such that the number of times of total collections per unit time by the data-collecting unit 11 is equal to or smaller than the first predetermined number of times.

As a result, the control apparatus 10 can determine the collection interval CI of each data item DI such that the number of times of total collections per unit time does not exceed the first predetermined number of times, which is the upper limit value set from the network configuration and the like.

(4-6)

In the control apparatus 10 of the present embodiment, the collection-interval-determining unit 12 determines the collection interval CI of each data item DI such that the number of times of collections of each data item DI per unit time by the data-collecting unit 11 is equal to or larger than the second predetermined number of times set for each data item DI.

As a result, the control apparatus 10 can determine the collection interval CI of each data item DI such that the number of times of collections of each data item DI per unit time is equal to or larger than the second predetermined number of times, which is the minimum number of times of collections required to maintain each of the controls.

(4-7)

In the control apparatus 10 of the present embodiment, the storing unit 13 further stores the second rule RL under which the priorities PR for the collections of the data items DI are determined from the control setting content SU. On the basis of the second rule RL, the collection-interval-determining unit 12 determines, from the control setting content SU, the priorities PR of the data items DI. On the basis of the determined priorities PR, the collection-interval-determining unit 12 determines the collection intervals CI of the data items DI.

As a result, according to the contents of the second rule RL, the control apparatus 10 can determine, from the control setting content SU, the collection intervals CI of the data items DI.

(4-8)

In the control apparatus 10 of the present embodiment, the collection-interval-determining unit 12 proportionally distributes the first predetermined number of times per unit time according to the priority PR of each data item DI to determine the collection interval CI of each data item DI.

As a result, the control apparatus 10 can proportionally distribute the first predetermined number of times according to the priority PR of each data item DI to determine the collection interval CI of each data item DI.

(5) Modifications (5-1) Modification 1A

In the present embodiment, the setting content SU of each control is the predetermined times SU1 to SU4. However, the setting content SU of each control may include "valid or invalid" of each control.

For example, when the chiller units 30a to 30c are activated, the control-setting unit 14 sets the setting content SU "valid or invalid" of each control to "valid". In other words, it is assumed that the initial value of the setting content SU "valid or invalid" is "valid".

In a case where the setting content SU "valid or invalid" of each control is "valid", for example, the collection-interval-determining unit 12 determines the collection intervals CI on the basis of the second rule RL of the present embodiment, according to the predetermined times SU1 to SU4.

In a case where the setting content SU "valid or invalid" of a certain control is "invalid", for example, the collection-interval-determining unit 12 determines that the partial priority of the data item DI related to the control is an allowable minimum value.

(5-2) Modification 1B

In the present embodiment, on the basis of the second rule RL, the collection-interval-determining unit 12 determines, from the control setting content SU, the priority PR of each data item DI. Thereafter, the collection-interval-determining unit 12 proportionally distributes the first predetermined number of times per unit time according to the priorities PR to determine the collection interval CI of each data item DI.

However, the collection-interval-determining unit 12 may not use the concept of the priority PR to determine, from the setting content SU of each control, the collection interval CI of each data item DI. Hereinafter, a rule on the basis of which the collection-interval-determining unit 12 determines, from the setting content SU of each control, the collection interval CI of each data item DI is referred to as a first rule.

In other words, the storing unit 13 further stores the first rule under which the collection intervals CI of the data items DI are determined from the control setting content SU. On the basis of the first rule, the collection-interval-determining unit 12 determines, from the control setting content SU, the collection intervals CI of the data items DI.

As a result, according to the contents of the first rule, the control apparatus 10 can determine, from the setting content SU of each control, the collection intervals CI of the data items DI.

In the first rule, for example, in Table 2, at the positions where the partial priorities are stored, the reciprocals of the corresponding predetermined times SU1 to SU4 are set instead of the partial priorities. Similarly, the maximum values in the row direction are set in the rightmost column of Table 2. In the first rule, according to the maximum values, the first predetermined number of times per unit time is proportionally distributed to determine the collection interval CI of each data item DI.

(5-3) Modification 1C

In the present embodiment, on the basis of the second rule RL, the collection-interval-determining unit 12 determines, from the control setting content SU, the priority PR of each data item DI. Thereafter, the collection-interval-determining unit 12 proportionally distributes the first predetermined number of times per unit time according to the priorities PR to determine the collection interval CI of each data item DI.

However, the collection-interval-determining unit 12 may not use the proportional distribution to determine, from the priorities PR, the collection interval CI of each data item DI. Hereinafter, a rule on the basis of which the collection-interval-determining unit 12 determines, from the priorities PR, the collection interval CI of each data item DI is referred to as a third rule.

In other words, the storing unit 13 further stores the third rule under which the collection intervals CI of the data items DI are determined from the priorities PR of the data items DI. On the basis of the third rule, the collection-interval-determining unit 12 determines, from the priorities PR of the data items DI, the collection intervals CI of the data items DI.

As a result, according to the contents of the third rule, the control apparatus 10 can determine, from the priorities PR of the data items DI, the collection intervals CI of the data items DI.

The third rule is, for example, a rule in which the number of times of collections per unit time is set for each value of the priority PR.

(5-4) Modification 1D

In the present embodiment, the control apparatus 10 is used to control the chiller units 30a to 30c in the air-conditioning system 100. However, the control apparatus 10 may be used to control ventilation apparatuses in a ventilation system, outdoor units in an ice heat storage air-conditioning system, or the like. Alternatively, the control apparatus 10 may be used to control water heaters in a water heater system, or the like.

(5-5)

Although the embodiments of the present disclosure have been described above, it will be understood that various changes in the forms and details can be made without departing from the spirit and scope of the present disclosure as set forth in the claims.

The invention claimed is:

1. A control apparatus comprising:
a processor; and
a storage, the storage storing a program and information regarding a plurality of data items to be collected during each of a plurality of control modes,
the control apparatus being configured to be communicably connected to an external apparatus different from the control apparatus and control the external apparatus in accordance with any one of the plurality of control modes,
the processor being configured to execute the program to
acquire a plurality of setting contents for the plurality of control modes, each of the plurality of setting contents including at least one value used to control the external apparatus in accordance with each of the plurality of control modes,
determine a plurality of collection intervals based on the plurality of setting contents, each of the plurality of collection intervals corresponding to one of the plurality of data items,
receive a selection of one control mode among, the plurality of control modes,
determine at least one specific data item, among the plurality of data items, to be collected during execution of the one control mode based on the information regarding the plurality of data items,
control the external apparatus in accordance with the one control mode, and
collect data corresponding to each of the at least one specific data item from the external apparatus periodically in accordance with a corresponding collection interval among the plurality of collection intervals.

2. The control apparatus according to claim 1, wherein
the external apparatus includes a plurality of external apparatuses,
the control apparatus is configured to be communicably connected to the plurality of external apparatuses, and
the control apparatus is configured to control each of the plurality of external apparatuses in accordance with each of the plurality of control modes.

3. The control apparatus according to claim 2, wherein
the processor is configured to determine the corresponding collection interval of each of the plurality of data items such that a number of times of total collections per unit time is equal to or smaller than a first predetermined number of times.

4. The control apparatus according to claim 2, wherein
the processor is configured to determine the corresponding collection interval of each of the plurality of data items such that a number of times of the collections of each of the plurality of data items per unit time by the is equal to or larger than a second predetermined number of times set for each of the plurality data items.

5. The control apparatus according to claim 2, wherein
the storage further stores a first rule usable to determine the plurality of collection intervals from the plurality of setting contents, and
based on the first rule, the processor is configured to determine the plurality of collection intervals from the plurality of setting contents.

6. The control apparatus according to claim 2, wherein
the storage, further stores a second rule usable to determine a plurality of priorities from the plurality of setting contents, each of the plurality of priorities corresponding to one of the plurality of data items, and
the processor is configured to
determine the plurality of priorities from the plurality of setting contents based on the second rule, and,
determine the plurality of collection intervals based on the plurality of priorities.

7. The control apparatus according to claim 1, wherein
the processor is configured to determine the corresponding collection interval of each of the plurality of data items such that a number of times of total collections per unit time is equal to or smaller than a first predetermined number of times.

8. The control apparatus according to claim 7, wherein
the processor is configured to determine the collection interval of each of the plurality of data items such that a number of times of the collections of each of the plurality of data items per unit time is equal to or larger than a second predetermined number of tunes set for each of the plurality of data item.

9. The control apparatus according to claim 7, wherein
the storage further stores a first rule usable to determine the plurality of collection intervals from the plurality of setting contents, and
based on the first rule, the processor is configured to determine the plurality of collection intervals from the plurality of setting contents.

10. The control apparatus according to claim 7, wherein
the storage further stores a second rule usable to determine a plurality of priorities from the plurality of setting contents, each of the plurality of priorities corresponding to one of the plurality of data items, and
the processor is configured to
determine the plurality of priorities of from the plurality of setting contents based on the second rule, and,
determine the plurality of collection intervals based on the plurality of priorities.

11. The control apparatus according to claim 1, wherein
the processor is configured to determine the corresponding collection interval of each of the plurality of data items such that a number of times of the collections of each of the plurality of data items per unit time is equal to or larger than a second predetermined number of times set for each of the plurality of data items.

12. The control apparatus according to claim 11, wherein
the storage further stores a first rule usable to determine the plurality of collection intervals from the plurality of setting contents, and
based on the first rule, the processor is configured to determine the plurality of collection intervals from the plurality of setting contents.

13. The control apparatus according to claim 11, wherein
the storage further stores a second rule usable to determine a plurality of priorities from the plurality of setting contents, each of the plurality of priorities corresponding to one of the plurality of data items, and
the processor is configured to
determine the plurality of priorities of from the plurality of setting contents based on the second rule, and,
determine the plurality of collection intervals based on the plurality of priorities.

14. The control apparatus according to claim 1, wherein
the storage further stores a first rule usable to determine the plurality of collection intervals from the plurality of setting contents, and
based on the first rule, the processor is configured to determine the plurality of collection intervals from the plurality of setting contents.

15. The control apparatus according to claim 1, wherein
the storage further stores a second rule usable to determine a plurality of priorities from the plurality of setting contents, each of the plurality of priorities corresponding to one of the plurality of data items, and
the processor is configured to
determine the plurality of priorities from the plurality of setting contents based on the second rule, and,
determine the plurality of collection intervals based on the plurality of priorities.

16. The control apparatus according to claim 15, wherein
the processor is configured to determine the corresponding collection interval of each of the plurality of data items such that a number of times of total collections per unit time by the data collecting unit is equal to or smaller than a first predetermined number of times, and
the processor is configured to proportionally distribute the first predetermined number of times per unit time according to the priority of each of the plurality of data items to determine the corresponding collection interval of each of the plurality of data items.

17. The control apparatus according to claim 15, wherein
the storage further stores a third rule usable to determine the plurality of collection intervals from the plurality of priorities, and
based on the third rule, the processor is configured to determine the plurality of collection intervals from the plurality of priorities.

18. A control system comprising:
the control apparatus according to claim 1; and
the external apparatus, the external apparatus being communicably connected to the control apparatus.

19. The control apparatus according to claim 1, wherein
the processor is further configured to receive a change, by a user, to at least one setting content among the plurality of setting contents and update the plurality of collection intervals in response to the change.

* * * * *